A. R. PETERSON.
RAT TRAP.
APPLICATION FILED MAR. 27, 1914.
1,110,006.
Patented Sept. 8, 1914.
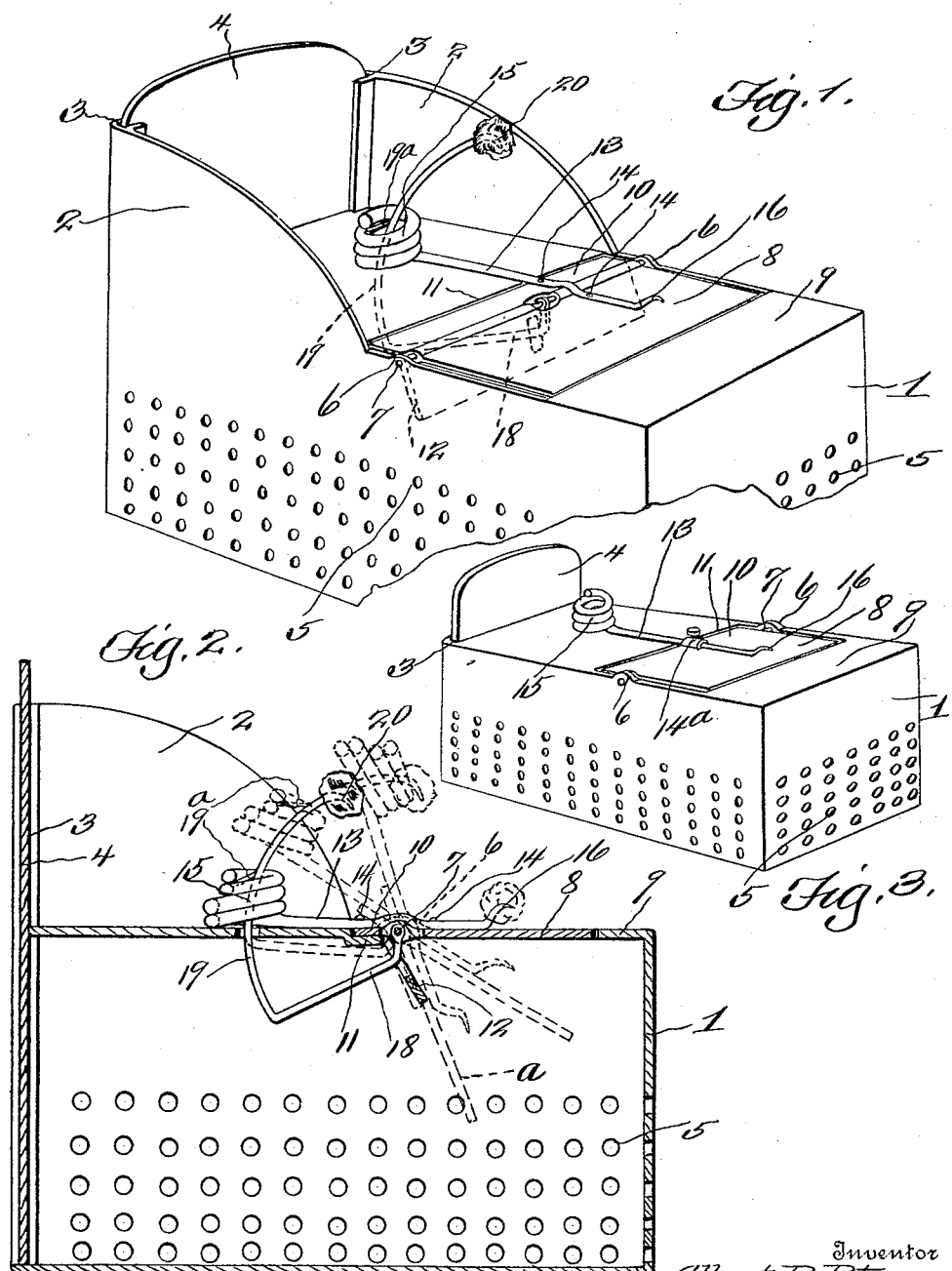
Witnesses
A. R. Wolfe
Frances F. Boswell
Inventor
Albert R. Peterson,
By D. Swift & Co.,
his Attorneys

UNITED STATES PATENT OFFICE.

ALBERT R. PETERSON, OF MINDEN, NEBRASKA.

RAT-TRAP.

1,110,006.  Specification of Letters Patent.  Patented Sept. 8, 1914.

Application filed March 27, 1914. Serial No. 827,633.

*To all whom it may concern:*

Be it known that I, ALBERT R. PETERSON, a citizen of the United States, residing at Minden, in the county of Kearney and State of Nebraska, have invented a new and useful Rat-Trap; and I do hereby declare the following to be a full, clear, and exact description of the invention, such as will enable others skilled in the art to which it appertains to make and use the same.

This invention relates to a new and useful rat trap.

An object of the invention is the provision of a downwardly spring trap member held in a normal raised position by a weight member, which not only acts as a weight or gravity member, but is also extended forwardly on the trap member and terminates in means to receive the bait. However, in some instances the trap member is provided with a rod movable therewith having a segmental curved portion passing through the top of the body of the trap forming a guide for the coiled weighted end of the gravity member. This rod only moves with the trap member for a partial distance, then the trap member moves independently. In this way the bait on the end of the curved segmental rod is lowered farther toward the trap opening, so that on further movement of the trap member the weighted coil of the gravity device will dislocate or knock the bait off the end of the curved segmental portion of the rod, said bait falling through the trap opening with the rat. The rat in nibbling on the bait of the segmental portion of the rod will assist in operating the trap member, as will be found, and being that the bait will tend to move at the same time the trap member lowers, the rat will be unconscious as to the fact that the trap member is lowering with him, therefore will not endeavor to escape.

In some instances as shown in the drawings, the weight member performs two functions, namely as a gravity member for closing the trap member, and as a bait attaching member.

As shown in Figures 1 and 2 there are two bait attaching members, one is the segmental rod, and the other is one end of the gravity member.

In practical fields the details of construction may be subjected to alterations, falling within the scope of what is claimed.

The invention comprises further features and combination of parts, as hereinafter set forth, shown in the drawings and claimed.

In the drawings:—Fig. 1 is a view in perspective of the trap constructed in accordance with the invention. Fig. 2 is a sectional view on line 2—2 of Fig. 1, showing in dotted lines the abnormal position of the trap member. Fig. 3 is a perspective view of a form of trap, in which the segmental rod is eliminated.

Referring more especially to the drawing 1 designates the body or inclosure of the trap, which in Figs. 1 and 2 at one end upon the top thereof is provided with side flanges 2. Throughout all the views of the drawings the body of the trap at one end is constructed with perpendicular guides 3 for the sliding closure 4, which is designed to be raised for removing the animal or rat. The flanges 2 constitute guard members to prevent the rat or animal from reaching the bait from the rear. The body member 1 is constructed with a plurality of apertures or perforations 5 in order to permit of proper circulation of air.

Mounted in ears 6 of the body member is a rod 7, on which the trap member 8 is pivoted. This trap member when closed, as shown in Figs. 1 and 2 is arranged flush with the upper surface 9 of the body 1. To allow the trap member to fit flush with the upper surface of the body member the rear portion 10 of the trap member seats in a recess 11 of the upper surface or top 9 of the body 1. Projecting downwardly and slightly forwardly of the recessed part of the top of the body member is a flange 12, which slightly yields when the trap member lowers. When the weight of the rat upon the trap member is relieved, the flange 12 rebounds to its normal position as shown in full lines in Fig. 2, acting to assist in returning the trap member to its normal position.

As shown in Figs. 1 and 2 a rod 13 is secured at 14 to the part 10 of the trap member. One end of this rod 13 terminates in a weighted coil 15, while the other end of the rod terminates in a projection 16 to receive a bait, as shown. When the rat or animal crawls upon the trap member, the same lowers or tilts, and the rat falls in the body member or receptacle of the trap, the coil member or weight 15 acting to return the trap member to its normal position. Secured to the rod 7 is a rod 18 terminating in a segmental portion 19, which passes up through the rear upper portion of the receptacle 1 and also through the gravity coil 15 and terminates in a hook 20 to also receive bait.

As shown in Figs. 1 and 2 it will be seen that the trap may be baited in two places, thereby offering a double temptation for the rat to crawl upon the trap member 8. If the rat nibbles on the bait at 20, it will be unconscious of the fact that the trap member is lowering with its weight, owing to the fact that the segmental portion 19 of the rod 18 is moving with the trap member 8 to a partial distance, say for instance, until the rat is quite within the opening of the member 1, which opening is controlled by the trap member, then the trap member will move independently, in which case the gravity coils will dislodge the bait at 20, the bait also falling through the opening.

In Fig. 3 the rod 18 with its segmental portion is eliminated, and the rod 13 is adjustably secured to the trap member as at 14ª, so that the gravity coil and the bait at 16 may be adjusted relative to the trap member. For instance, the bait at 16 may be adjusted closer to the pivot of the trap member, in which case the gravity coil will be adjusted farther from the pivot, and in this case the gravity coil will act to close the trap member quicker. If the bait at 16 is adjusted farther from the pivot of the trap member, the gravity coil will return the trap member to its normal position slower.

When the trap member 8 starts to move downwardly the gravity coil 15 contacts with a spring projection 19ª upon the segmental portion 19, thereby causing the portion 19 to move at the same time the trap member 8 moves. But when the rod 18 contacts with the under surface of the top of the receptacle, the weight of the rat upon the trap member 8 overcomes the tension of the spring projection 19ª, causing the gravity coil to push past the said projection 19ª, so as to permit the trap member to move to the position shown at $a$ in dotted lines in Fig. 2. It will be observed that when the trap member is in this position, the gravity coil is in the act of dislodging the bait at 20. The rod 18 and the member 8 are frictionally mounted upon the rod 7, and after the rod 18 has ceased moving as the member or platform 8 moves downwardly, by contacting with the under face of the upper wall of the casing, the member 8 is capable of further movement under pressure from the weight of the animal, so as to push past said projection 19ª, thereby permitting the member or platform 8 to complete its full movement. After the member or platform 8 has completed its full movement, and the animal is deposited or dropped in the casing of the trap, it will be seen that the platform or member 8 will easily return to its normal position, thereby preventing the animal from escaping through the opening through which it entered. However, when the trap member or platform 8 returns to its initial position, the rod 18 does not fully return to its normal position, and it is not essential that it should return to such normal position at the time of trapping the animal. The rod 18 may be set in its normal position manually at the time of resetting the trap.

The invention having been set forth, what is claimed as new and useful is:—

1. An animal trap comprising a receptacle having a closure member at one end and an opening in its top portion adjacent the opposite end, a trap member pivoted adjacent said opening and adapted to swing therethrough into said receptacle, a rod secured to the trap member having a gravity actuating member at one end acting to close the trap member, and a bait attaching means at the other end.

2. A rat trap comprising a receptacle having a closure member at one end and an opening in its top portion adjacent the opposite end, said receptacle having a recess in its top, a trap member pivoted adjacent said opening and seated in said recess when closed, a rod carried by the trap member terminating at one end in a gravity coil, and a bait attaching means at the opposite end, a rod on which said trap member is pivoted, a rod connected to the pivot rod and having a segmental portion passing through the top of the receptacle and through the gravity coil and terminating in a second bait attaching means, said segmental portion acting as a guide for the coil and a guide for the trap member.

3. A rat trap comprising a receptacle having a closure member at one end and an opening in its top portion adjacent the opposite end, said receptacle having a recess in its top, a trap member pivoted adjacent said opening and seated in said recess when closed, a rod carried by the trap member terminating at one end in a gravity coil, and a bait attaching means at the opposite end, a rod on which said trap member is pivoted, a rod connected to the pivot rod and having a segmental portion passing through the top of the receptacle and through the gravity coil and terminating in a second bait attaching means, said segmental portion acting as a guide for the coil and a guide for the trap member, said rod attached to the pivot rod acting to move with the trap member for a partial movement, and means to permit the trap member on its further movement to move independently, thereby causing the gravity coil to dislodge the second bait.

In testimony whereof I have signed my name to this specification in the presence of two subscribing witnesses.

ALBERT R. PETERSON.

Witnesses:
EDWIN CURTIS,
L. A. DASHER.

Copies of this patent may be obtained for five cents each, by addressing the "Commissioner of Patents, Washington, D. C."